United States Patent
Aljishi et al.

(10) Patent No.: US 11,248,174 B2
(45) Date of Patent: Feb. 15, 2022

(54) PROCESS TO REMOVE ASPHALTENE FROM HEAVY OIL BY SOLVENT

(71) Applicant: SAUDI ARABIAN OIL COMPANY, Dhahran (SA)

(72) Inventors: Mohammad F. Aljishi, Dhahran (SA); Ki-Hyouk Choi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 39 days.

(21) Appl. No.: 16/729,158

(22) Filed: Dec. 27, 2019

(65) Prior Publication Data

US 2021/0198582 A1    Jul. 1, 2021

(51) Int. Cl.
| | |
|---|---|
| C10G 21/02 | (2006.01) |
| C10G 21/14 | (2006.01) |
| C10G 21/00 | (2006.01) |
| B01D 11/04 | (2006.01) |
| B01F 7/00 | (2006.01) |

(Continued)

(52) U.S. Cl.
CPC ........ C10G 21/003 (2013.01); B01D 11/0488 (2013.01); B01D 11/0492 (2013.01); B01F 7/008 (2013.01); C10G 21/02 (2013.01); C10G 21/14 (2013.01); C10G 21/28 (2013.01); *B01D 2011/002* (2013.01); *B01F 2215/0427* (2013.01); *B01F 2215/0431* (2013.01); *B01F 2215/0459* (2013.01); *B01F 2215/0468* (2013.01); *B01F 2215/0472* (2013.01); *C10G 2300/107* (2013.01); *C10G 2300/1077* (2013.01); *C10G 2300/202* (2013.01); *C10G 2300/205* (2013.01); *C10G 2300/206* (2013.01); *C10G 2300/208* (2013.01); *C10G 2300/302* (2013.01); *C10G 2300/308* (2013.01);

(Continued)

(58) Field of Classification Search
None
See application file for complete search history.

(56) References Cited

U.S. PATENT DOCUMENTS

| | | |
|---|---|---|
| 3,626,675 A | 12/1971 | Chaplin |
| 3,830,732 A | 8/1974 | Gatsis |

(Continued)

FOREIGN PATENT DOCUMENTS

CN    204162660 U    2/2015

OTHER PUBLICATIONS

Aljishi et al., "Effect of flow structure at the onset of instability on barium sulfate precipitation in Taylor-Couette crystallizers", Journal of Crystal Growth, 2013, pp. 20-31, Elsevier.

(Continued)

*Primary Examiner* — Tam M Nguyen
(74) *Attorney, Agent, or Firm* — Bracewell LLP; Constance Gall Rhebergen

(57) ABSTRACT

Embodiments of the disclosure produce a method and system for deasphalting a hydrocarbon feed. The hydrocarbon feed and a first solvent is combined using a Taylor-Couette mixer to form a mixed stream. The mixed stream and a second solvent are introduced to an extractor to produce a first deasphalted oil stream and a pitch stream. The first deasphalted oil stream is introduced to a solvent recovery unit to recover the first solvent and the second solvent via a recovered solvent stream and to produce a second deasphalted oil stream.

10 Claims, 2 Drawing Sheets

(51) Int. Cl.
*C10G 21/28* (2006.01)
*B01D 11/00* (2006.01)

(52) U.S. Cl.
CPC ............ *C10G 2300/4006* (2013.01); *C10G 2300/4012* (2013.01); *C10G 2300/44* (2013.01)

(56) References Cited

U.S. PATENT DOCUMENTS

| | | | |
|---|---|---|---|
| 4,088,540 A | 5/1978 | Bunas | |
| 7,566,394 B2 | 7/2009 | Koseoglu | |
| 7,585,407 B2 | 9/2009 | Duyvesteyn et al. | |
| 7,846,326 B2 | 12/2010 | Zare | |
| 9,944,864 B2 | 4/2018 | Corscadden et al. | |
| 9,976,093 B2 | 5/2018 | Corscadden et al. | |
| 2005/0170516 A1 | 8/2005 | Kharrat et al. | |
| 2006/0054549 A1* | 3/2006 | Schoendorfer | B01D 65/08 210/360.1 |
| 2008/0226513 A1* | 9/2008 | Morbidelli | B01F 7/008 422/135 |
| 2010/0009874 A1* | 1/2010 | Ballard | C09K 8/03 507/118 |
| 2011/0266198 A1 | 11/2011 | Hassan et al. | |
| 2013/0098735 A1 | 4/2013 | Corscadden et al. | |
| 2013/0197289 A1 | 8/2013 | Borane et al. | |
| 2013/0264247 A1 | 10/2013 | Cardenas et al. | |
| 2014/0120169 A1* | 5/2014 | Lee | A61K 31/711 424/499 |
| 2015/0175440 A1* | 6/2015 | Schoendorfer | C02F 1/001 210/787 |
| 2016/0068768 A1* | 3/2016 | Ganyu | C10G 67/0463 208/86 |
| 2017/0369796 A1* | 12/2017 | Le Coz | C10G 65/12 |
| 2018/0034050 A1* | 2/2018 | Son | H01M 4/525 |
| 2018/0042290 A1* | 2/2018 | Buhlmann | A47J 31/40 |
| 2018/0119026 A1 | 5/2018 | Kinzl et al. | |
| 2018/0134972 A1* | 5/2018 | Brown | B03C 5/02 |
| 2019/0036159 A1* | 1/2019 | Kim | H01M 10/0562 |
| 2019/0093025 A1* | 3/2019 | Govindhakannan | C10G 53/06 |
| 2019/0161687 A1 | 5/2019 | Wilfried et al. | |
| 2019/0233746 A1* | 8/2019 | Govindhakannan | C10G 53/06 |
| 2021/0113981 A1* | 4/2021 | Lin | B01J 19/0066 |

OTHER PUBLICATIONS

Maqbool, "Understanding The Kinetics of Asphaltene Precipitation From Crude Oils", A dissertation submitted in partial fulfillment of the requirements for the degree of Doctor of Philosophy in The University of Michigan, 2011, pp. 149, Tabish Maqbool.

Naseem et al., "Experimental investigation of flow instabilities in a wide gap turbulent rotating Taylor-Couette flow", Case Studies in Thermal Engineering, 2019, pp. 12, Elsevier Ltd.

PCT Search Report dated Mar. 23, 2021, in the prosecution of International application No. PCT/US2020/066937, 14 pages.

* cited by examiner

PROCESS TO REMOVE ASPHALTENE FROM HEAVY OIL BY SOLVENT

BACKGROUND

Field of the Disclosure

Embodiments of the disclosure generally relate to hydrocarbon processing. More specifically, embodiments of the disclosure relate to a method and system for removing asphaltene from a hydrocarbon feed using a solvent.

Description of the Related Art

Petroleum crude oil typically includes certain degrees of saturate, aromatic, resin, and asphaltene (SARA) fractions. Among these fractions, asphaltene has the greatest density and polarity, where individual asphaltene molecules tend to attract and aggregate against one another to form an aggregate or precipitate that exhibits fluid properties vastly different from other fractions.

The presence of asphaltene in crude oil and its fractions reduces the economic value and constraints further hydrocarbon processing. Asphaltenes are typically removed or converted to a maltene fraction, which have been practiced in the industry for many years. One method is to upgrade asphaltene such that the resulting fraction has reduced density, molecular weight, and polarity. Such upgrading can be achieved by non-catalytic thermal processes such as coking or catalytic processes such as catalytic hydroprocessing and catalytic cracking. A coking process converts asphaltene to solid coke under thermal cracking conditions.

In catalytic hydroprocessing, hydrogen (typically having a pressure greater than 15 megapascals (MPa)) is introduced to the hydroprocessing unit not only to be utilized as a hydrogen source but also to prevent coke or coke precursors (products of asphaltene) from blocking active sites of the catalyst. However, such hydrogen injection merely slows down the catalyst deactivation process; inevitably, the hydroprocessing unit undergoes periodic shut-downs to regenerate or replace the catalyst. Another way to mitigate asphaltene in catalytic hydroprocessing involves physically separating the asphaltene from the hydrocarbon feed before introduction to the hydroprocessing unit. The resulting deasphalted oil (DAO) fraction is substantially lacking of concentrated impurities such as sulfur, nitrogen, vanadium, and nickel, and has a greater activity than the initial asphaltene-containing hydrocarbon fraction.

Understanding mixing characteristics and the influence of flow behavior on mass transport is critical in order to enhance the performance in reactive flows, where the interaction between fluid dynamics and chemical reactions plays a major role. In chemical processes (including refining processes), mass transfer is one of the critical parameters that govern the conversion performance. In particular, mass transfer is a dominant factor in a process where multiple phases (such as gas, liquid, and solid phases) are involved.

SUMMARY

Embodiments of the disclosure generally relate to hydrocarbon processing. More specifically, embodiments of the disclosure relate to a method and system for removing asphaltene from a heavy hydrocarbon feed using a solvent.

Advantageously, embodiments of the disclosure enhance the conversion performance of certain chemical processes by implementing efficient reactors with optimum process intensification and investigating the interactions between fluid flow, phase mixing, and mass transfer on a fundamental level. Such intensified processes with improved mass transfer rates can result in reduced energy and capital costs due to the reactors' compact size. In addition, when reactants differ in viscosity and are sparingly soluble to one another, it becomes even more crucial to develop certain mixing techniques to overcome mass transfer limitations to attain greater process performance and energy efficiency.

Embodiments of the disclosure provide improvements over conventional solvent deasphalting (SDA) processes by implementing an efficient mixing stage before extraction. In particular, a Taylor-Couette (TC) type mixing device is utilized to efficiently mix a feed oil with a solvent, where the TC type mixing device provides increased shear rates under substantially uniform fluid dynamic conditions. In this manner, a reduced quantity a solvent can be used in the SDA process while efficiently removing asphaltenes. Also, the extractor used in the SDA process can be of lesser volume than conventional extractors while efficiently removing asphaltenes.

Embodiments of the disclosure provide a method for deasphalting a hydrocarbon feed. The method includes the step of combining the hydrocarbon feed and a first solvent using a TC mixer to form a mixed stream. The hydrocarbon feed includes asphaltenes. The method includes the step of introducing the mixed stream and a second solvent to an extractor to produce a first deasphalted oil stream and a pitch stream. The first deasphalted oil stream is substantially deficient of asphaltenes. The pitch stream includes the asphaltenes. The method includes the step of introducing the first deasphalted oil stream to a solvent recovery unit to recover the first solvent and the second solvent via a recovered solvent stream and to produce a second deasphalted oil stream. The second deasphalted oil stream is substantially in the absence of the first solvent and the second solvent.

In some embodiments, the hydrocarbon feed includes an atmospheric residue fraction, a vacuum residue fraction, and combinations thereof. In some embodiments, the method further includes the step of pressurizing the hydrocarbon feed to a pressure ranging between 2 megapascals (MPa) and 4 MPa. The method further includes the step of heating the hydrocarbon feed to a temperature ranging between 150 deg. C. and about 350 deg. C. In some embodiments, the method further includes the step of pressurizing the first solvent to a pressure ranging between 2 MPa and 4 MPa. In some embodiments, the first solvent includes propane, n-butane, n-pentane, and combinations of the same. In some embodiments, the mixed stream has a solvent-to-oil volume ratio ranging between 0.2 and 2. In some embodiments, the method further includes the step of pressurizing the second solvent to a pressure ranging between 2 MPa and 4 MPa. In some embodiments, the second solvent includes propane, n-butane, n-pentane, and combinations of the same. In some embodiments, the extractor is operated at a temperature ranging between 50 deg. C. and 150 deg. C. and a pressure ranging between 2 MPa and 4 MPa. In some embodiments, the second solvent is introduced to the extractor at a position vertically lower than that of the mixed stream. In some embodiments, the extractor is operated to have a total solvent-to-oil volume ratio ranging between 0.5 and 5. In some embodiments, the method further includes the step of depressurizing the first deasphalted oil stream to a pressure ranging between 0.05 MPa and 0.1 MPa. In some embodiments, the solvent recovery unit is operated at a temperature ranging between 50 deg. C. and 100 deg. C. and a pressure ranging between 0.05 MPa and 0.1 MPa such that the recovered solvent stream includes the first solvent and the second solvent existing in gas phase.

In some embodiments, the TC mixer includes an inner cylinder and an outer cylinder. The inner cylinder and the outer cylinder are concentric. The outer cylinder is stationary and includes an inlet and an outlet. The inlet is configured to receive the hydrocarbon feed and the first solvent. The outlet is configured to exit the mixed stream. The inner cylinder is rotating at a predetermined angular velocity.

Embodiments of the disclosure also provide a solvent deasphalting system for deasphalting a hydrocarbon feed. The deasphalting system includes a first pump, a heater, a second pump, a TC mixer, a third pump, and extractor, a pressure reducer, and a solvent recovery unit. The first pump is configured to pressurize the hydrocarbon feed to a pressure ranging between 2 MPa and 4 MPa. The hydrocarbon feed includes asphaltenes. The heater is configured to heat the heat the hydrocarbon feed to a temperature ranging between 150 deg. C. and about 350 deg. C. The second pump is configured to pressurize a first solvent to a pressure ranging between 2 MPa and 4 MPa. The first solvent includes propane, n-butane, n-pentane, and combinations of the same. The TC mixer is fluidly connected downstream of the first pump and the heater and fluidly connected downstream of the second pump. The TC mixer is configured to combine the hydrocarbon feed and the first solvent to produce a mixed stream. The third pump is configured to pressurize a second solvent to a pressure ranging between 2 MPa and 4 MPa. The second solvent includes propane, n-butane, n-pentane, and combinations of the same. The extractor is fluidly connected downstream of the TC mixer and fluidly connected downstream of the third pump. The extractor is operated at a temperature ranging between 50 deg. C. and 150 deg. C. and a pressure ranging between 2 MPa and 4 MPa to produce a first deasphalted oil stream and a pitch stream. The first deasphalted oil stream is substantially in the absence of the asphaltenes. The pitch stream includes the asphaltenes. The pressure reducer is fluidly connected downstream of the extractor. The pressure reducer is configured to depressurize the first deasphalted oil stream to a pressure ranging between 0.05 MPa and 0.1 MPa. The solvent recovery unit is fluidly connected downstream of the pressure reducer. The solvent recovery unit is operated at a temperature ranging between 50 deg. C. and 100 deg. C. and a pressure ranging between 0.05 MPa and 0.1 MPa to produce a second deasphalted oil stream and a recovered solvent stream. The second deasphalted oil stream is substantially in the absence of the first solvent and the second solvent. The recovered solvent stream includes the first solvent and the second solvent existing in gas phase.

In some embodiments, the mixed stream has a solvent-to-oil volume ratio ranging between 0.2 and 2. In some embodiments, the extractor is operated to have a total solvent-to-oil volume ratio ranging between 0.5 and 5.

In some embodiments, the TC mixer includes an inner cylinder and an outer cylinder. The inner cylinder and the outer cylinder are concentric. The outer cylinder is stationary and includes an inlet and an outlet. The inlet is configured to receive the hydrocarbon feed and the first solvent. The outlet is configured to exit the mixed stream. The inner cylinder is rotating at a predetermined angular velocity.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

Figure 1:
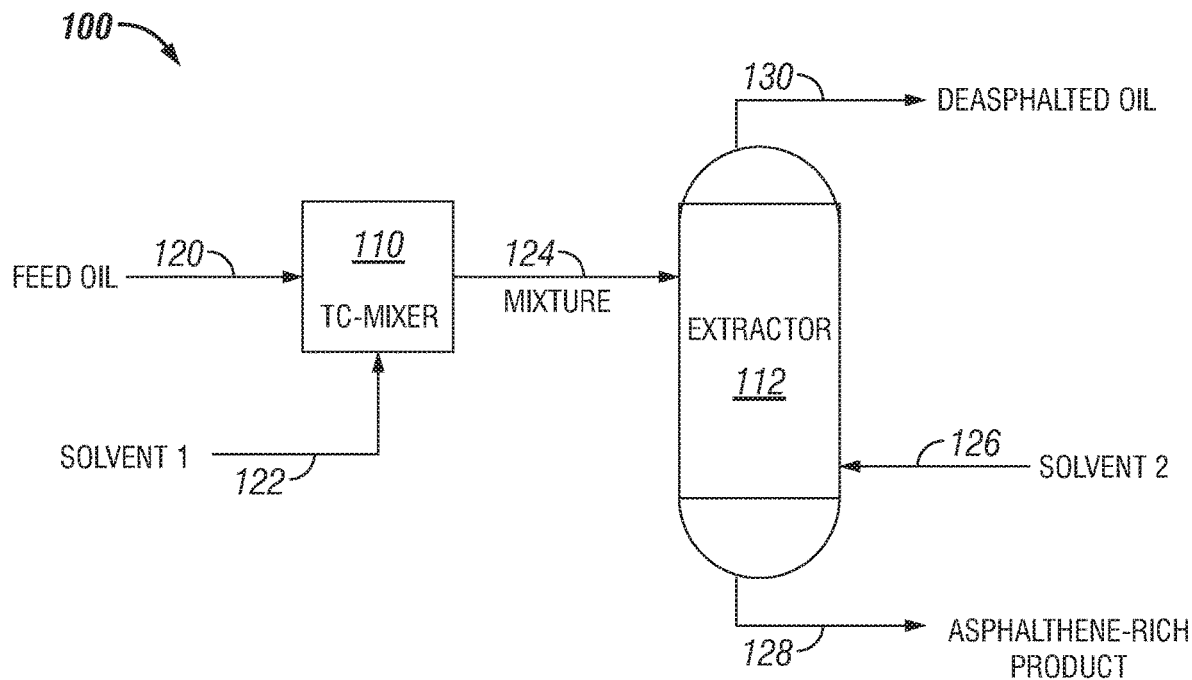
FIG. 1 is a schematic diagram of a process for removing asphaltene from an asphaltene-containing hydrocarbon fraction, according to an embodiment of the disclosure.

In the accompanying Figures, similar components or features, or both, may have a similar reference label.

DETAILED DESCRIPTION

The disclosure refers to particular features, including process or method steps and systems. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude. The word "substantially" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words such are for descriptive convenience and are not limiting unless otherwise indicated.

As used throughout the disclosure, the term "atmospheric residue" refers to the fraction of oil-containing streams having an initial boiling point (IBP) of 340 deg. C., such that all of the hydrocarbons have boiling points greater than 340 deg. C. and includes the vacuum residue fraction. Atmospheric residue can refer to the composition of an entire stream, such as when the feedstock is from an atmospheric distillation unit, or can refer to a fraction of a stream, such as when a whole range crude is used.

As used throughout the disclosure, the term "vacuum residue" refers to the fraction of oil-containing streams having an IBP of 540 deg. C. Vacuum residue can include a fraction having a true boiling point (TBP) 10% equal to or greater than about 565 deg. C. Vacuum residue can refer to the composition of an entire stream, such as when the feedstock is from a vacuum distillation unit or can refer to a fraction of stream, such as when a whole range crude is used.

As used throughout the disclosure, the term "asphaltene" refers to the fraction of an oil-containing stream which is not soluble in a n-alkane, particularly, n-heptane. Asphaltene content of the oil-containing stream can be measured by standard methods such as IP-143 or ASTM D 3279.

As used throughout the disclosure, the term "coke" refers to a toluene insoluble material that is present in petroleum or is formed in a reactor. The toluene-insoluble (or coke) content of an oil-containing stream can be measured by standard methods such as ASTM D 4072, ASTM 4372, or UOP 614-18.

As used throughout the disclosure, the term "cracking" refers to the breaking of hydrocarbons into smaller ones containing few carbon atoms due to the breaking of carbon-carbon bonds.

As used throughout the disclosure, the term "upgrade" means one or all of increasing API gravity, decreasing the amount of impurities, such as sulfur, nitrogen, and metals, decreasing the amount of asphaltene, and increasing the amount of distillate in a process outlet stream relative to the process feed stream. One of skill in the art understands that upgrade can have a relative meaning such that a stream can be upgraded in comparison to another stream, but can still contain undesirable components such as impurities. Such upgrading results in increase of API gravity, shifting distillation curve to lower temperature, decrease of asphalthene content, decrease of viscosity, and increase of light fractions such as naphtha and diesel.

As used throughout the disclosure, the term "conversion reaction" refers to one or more reactions that can upgrade a hydrocarbon stream including cracking, isomerization, alkylation, dimerization, aromatization, cyclization, desulfurization, denitrogenation, deasphalting, and demetallization.

FIG. 1 shows a schematic diagram of a process 100 for removing asphaltene from an asphaltene-containing hydrocarbon fraction, according to an embodiment of the disclosure. The process 100 can include TC mixer 110, extractor 112, and an optional solvent recovery unit (not shown).

Hydrocarbon feed 120 is introduced to the process 100. Hydrocarbon feed 120 includes a certain degree of asphaltene. Hydrocarbon feed 120 and first solvent feed 122 are introduced to TC mixer 110 to produce mixed stream 124. Mixed stream 124 and second solvent feed 126 are introduced to extractor to produce a pitch stream 128 at the bottom and DAO stream 130 at the top. Pitch stream 128 includes asphaltenes. Optionally, DAO stream 130 can be introduced to solvent recovery unit to recover the first solvent and the second solvent.

Separation of asphaltene from other components of a hydrocarbon fraction is typically conducted using a solvent that can precipitate the asphaltene. Such SDA process involves mixing an asphaltene-containing hydrocarbon feed with a solvent, which is introduced to an extractor. As shown for example in FIG. 1, the extractor produces an asphaltene-rich pitch fraction and a DAO fraction. Non-limiting examples of the solvent can include normal C3-C10 alkanes. Without being bound by any theory, using a heavier solvent results in an increased DAO yield; however, because a greater degree of asphaltene can be included in the produced DAO, the produced DAO can result in a lesser quality. For example, an SDA process using normal-C7 hydrocarbon as the solvent can produce a 10 wt. % pitch fraction and a 90 wt. % DAO fraction at the extractor, whereas an SDA process using normal-C5 hydrocarbons as the solvent can produce a 20 wt. % pitch fraction and an 80 wt. % DAO fraction at the extractor. However, the 90 wt. % DAO fraction produced using the normal-C7 hydrocarbon as the solvent has lesser quality than the 80 wt. % DAO fraction produced using the normal-C5 hydrocarbon as the solvent due to the presence of asphaltene. The extractor is typically operated at a temperature ranging between about 50 deg. C. and about 230 deg. C., a pressure ranging between about 2 MPa and about 4 MPa. The solvent-to-oil (S/O) volume ratio ranges between about 4 and about 13.

It is known in the art that the S/O ratio affects the yield and quality of the produced DAO fraction. Without being bound by any theory, a greater S/O ratio corresponds to a better quality DAO at the same DAO yield. In order to reduce the relative quantity of solvent used in the SDA process (that is, reducing the S/O ratio) while minimally sacrificing the quality of the produced DAO, conventional extractors are typically designed to maximize the contact time between the asphaltene-containing hydrocarbon feed and the solvent. Without being bound by any theory, the contact time has a positive correlation with the asphaltene yield (that is, 100%—DAO yield), especially in cases where the S/O ratio is relatively small. Because asphaltene molecules have sizes ranging in the nanoscale and are well-dispersed in the hydrocarbon fraction, increased contact time ensures that asphaltenes form aggregates or precipitates. However, maximizing the contact time results in increased equipment and operational costs related to the increased size of the extractor. Moreover, using less solvent in the SDA process can lead to difficulties in discharging the separated pitch fraction. The pitch fraction typically has a kinematic viscosity greater than 80,000 centiStokes (cSt) at 145 deg. C., essentially equivalent to a non-flowing substance. In order to discharge the pitch fraction, it is necessary to mix a solvent to reduce the kinematic viscosity such that the pitch fraction can flow.

Advantageously, embodiments of the disclosure provide the use of TC mixer in an SDA process to reduce the S/O ratio and the contact time without substantially increasing the size of extractor. Advantageously, embodiments of the disclosure also provide producing a substantially asphaltene-free DAO stream while maintaining a decent DAO yield.

Figure 2:
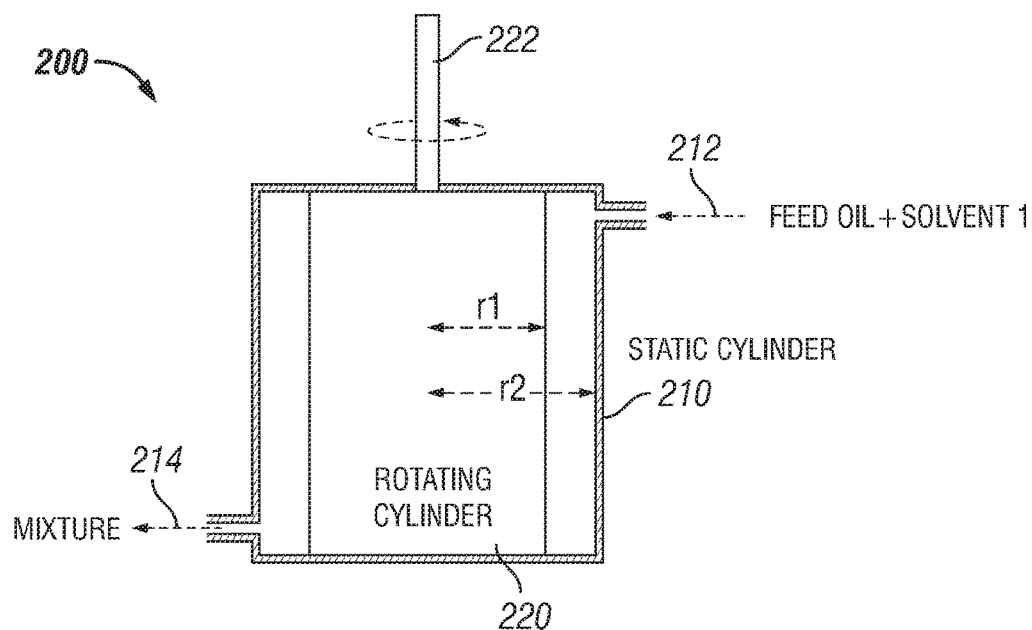
FIG. 2 is a schematic diagram of a TC mixer, according to an embodiment of the disclosure.

FIG. 2 shows a schematic diagram of a TC mixer 200, according to an embodiment of the disclosure. TC mixer 200 includes two concentric cylinders where outer cylinder 210 is stationary and inner cylinder 220 is rotating via rotor 222. Outer cylinder 210 has inlet 212 and outlet 214. Hydrocarbon feed 120 and first solvent feed 122 are introduced to inlet 212 and mixed stream 124 exits TC mixer 200 via outlet 214.

Without being bound by any theory, when a fluid flow is driven solely by cylinder rotation, a transition from azimuthal laminar flow to an axisymmetric cellular fluid motion occurs at a rotation speed greater than a critical rotation speed where the destabilizing centrifugal force exceeds the stabilizing viscous force. Such hydrodynamic instability is exhibited in a Taylor Vortex flow (TVF) regime, represented by a critical Taylor number ($Ta_c$), which involves uniformly spaced counter-rotating cellular vortices where each pair of counter-rotating cellular vortices forms an axial wave.

As shown in FIG. 2, inner cylinder 220 has a radius of $r_1$ and outer cylinder 210 has a radius of $r_2$. Inner cylinder 220 is rotating at an angular velocity of $\Omega_1$. The kinematic viscosity of the fluid introduced to TC mixer 200 is v. The length of both inner cylinder 220 and outer cylinder 210 is $L_r$.

The azimuthal Reynolds number ($Re_\theta$) corresponding to the rotation of inner cylinder 220 is expressed in equation (1):

$$Re_\theta = \frac{r_1 \Omega_1 d}{v} \quad (1)$$

where d is the gap width ($d=r_2-r_1$).

The Taylor number (Ta) corresponding to the rotation of inner cylinder 220 is expressed in equation (2):

$$Ta = \frac{2r_1^2 d^4}{r_2^2 - r_1^2}\left(\frac{\Omega_1}{v}\right)^2 = Re_\theta^2\left(\frac{2d}{r_2+r_1}\right) \quad (2)$$

The superimposed axial flow is characterized by the axial Reynolds number ($Re_z$) which corresponds to the total flowrate of TC mixer 200, expressed in equation (3):

$$Re_z = \frac{v_m d}{v} = \frac{Q(r_2-r_1)}{Av} = \frac{Q}{\pi(r_2+r_1)v} \quad (3)$$

where $v_m$ is the mean axial flow velocity of the fluid, Q is the volume flow rate of the fluid, and A is the area of the cross-sectional surface.

As expressed by the Taylor number, the degree of hydrodynamic instability depends on the geometry of TC mixer 200 and the properties of the introduced fluid. Non-limiting example parameters include the ratio of inner cylinder radius to outer cylinder radius ($\eta=r_1/r_2$), the gap width ($d=r_2-r_1$), the length aspect ratio ($L_r/d$), and the gap aspect ratio ($d/r_1$). As the rotation of inner cylinder 220 increases and the rotation speed exceeds a certain critical rotation speed, a higher order hydrodynamic instability becomes evident, for example, a flow regime transition to a wavy vortex flow (WVF) regime occurs where the axisymmetric cellular fluid motion transitions to a non-axisymmetric periodic flow. The fluid flow is capable of undergoing multiple phases of flow regime transitions through a progression of multiple flow instabilities. For example, a flow regime transition to a modulated wavy vortex flow (MWVF) or a turbulent Taylor vortex flow (TTVF) can be observed. A reduced Taylor number ($Ta_r=Ta/Ta_c$) is utilized to indicate the flow regime at each rotational speeds of the inner cylinder 220, where $Ta_c$ is the critical Taylor number unique to the geometry of TC mixer 200, and is dependent on the properties and the flow rate of the fluid introduced to TC mixer 200. These parameters can be determined experimentally.

Unlike mixing evident in a conventional plug flow reactor (PFR) where the mixing time is dependent solely on the reactant feed flow, the mixing time in TC mixer 200 is affected by the rotation of inner cylinder 220. As such, the mixing intensity can be controlled independent of the feed flow rate. Thus, TC mixer 200 combines the advantages of different conventional reactors (such as PFR and continuous stirred tank reactor (CSTR)), providing a narrow residence time distribution (an attribute of PFR) along with a homogeneous distribution of mixing intensity (an attribute of CSTR) while maintaining an increased degree of mixing, a greater surface-to-volume ratio, and an increased mass transfer efficiency. Advantageously, the use of TC mixer 200 utilizes intense local mixing combined with axial dispersion control. In this manner, mixing can be achieved in various scales ranging from macro-fluid motion, meso-scale mixing, and mixing in the microscale, which can be achieved through turbulent hydrodynamic conditions that enable fast attainment of a fluid state where molecular diffusion can be dominant.

The inner cylinder radius to outer cylinder radius ratio ($\eta$) can range between about 0.75 and about 0.95 or alternately between about 0.79 and about 0.92. In at least one embodiment, inner cylinder radius to outer cylinder radius ratio ($\eta$) is about 0.83. The gap aspect ratio ($d/r_1$) can range between about 0.05 and about 0.4 or alternately between about 0.075 and about 0.277. In at least one embodiment, the gap aspect ratio ($d/r_1$) is about 0.206. The rotation speed of the inner cylinder 220 is controlled to provide a reduced Taylor number $Ta_r$ greater than about 100 or alternately greater than about 1,000. The length aspect ratio ($L_r/d$) is greater than about 40 or alternately greater than about 55. In at least one embodiment, the length aspect ratio ($L_r/d$) is about 56. The inner volume of TC mixer 200 (defined by gap and length) can range between about 0.1% of the input volume flow rate and about 1% of the input volume flow rate. For example, the inner volume of TC mixer 200 can range between about 132.5 liters and about 1,325 liters at volume flow rate of about 20,000 barrels per day (BPD). In some embodiments, multiple TC mixers 200 can be used, which can be fluidly connected in series or in parallel, or both. Fluid flow in TC mixer 200 can be horizontal or vertical, or combined. In at least one embodiment, a vertical flow is used, which can be a downward or upward flow, or an alternating flow.

Figure 3:
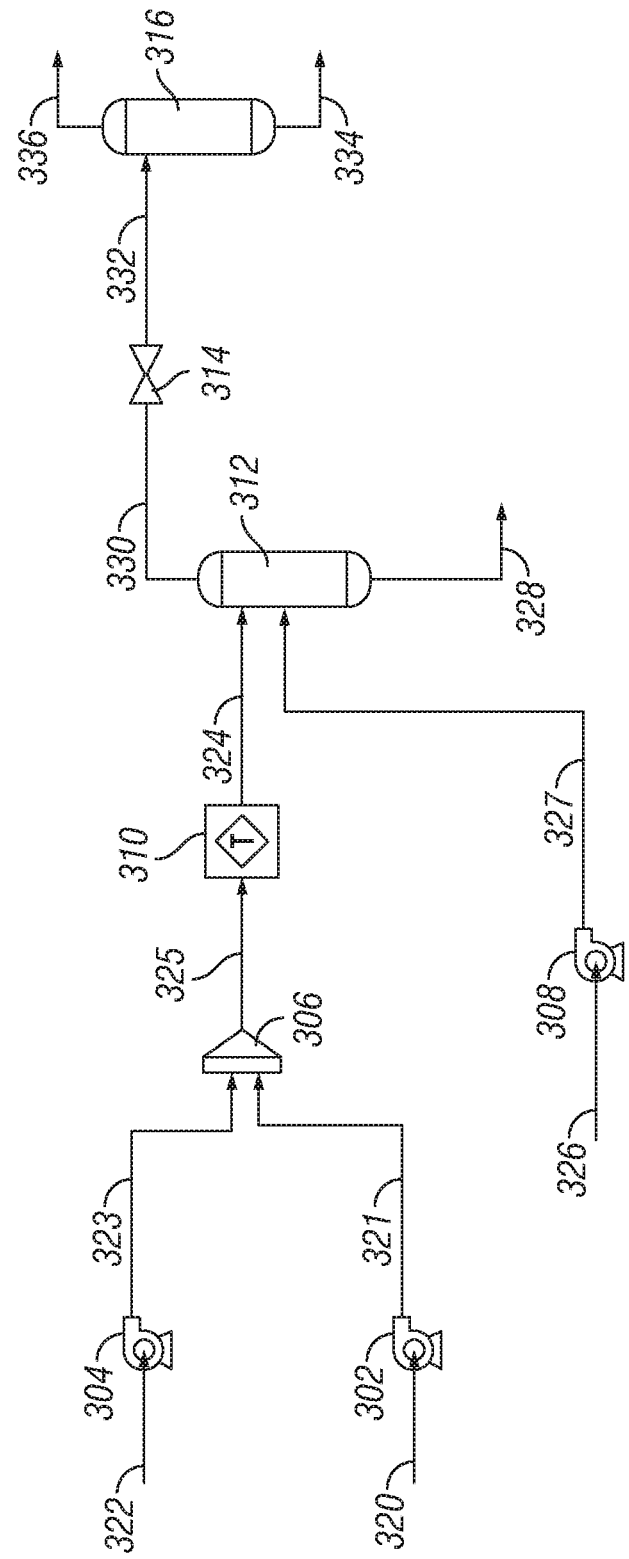
FIG. 3 is a schematic diagram of a process for removing asphaltene from an asphaltene-containing hydrocarbon fraction, according to an embodiment of the disclosure.

FIG. 3 shows a schematic diagram of a process 300 for removing asphaltene from an asphaltene-containing hydrocarbon fraction, according to an embodiment of the disclosure. The process 100 can include pump 302, pump 304, mixer 306, TC mixer 310, pump 308, extractor 312, pressure reducer 314, and solvent recovery unit 316.

Hydrocarbon feed 320 is introduced to the process 300. Hydrocarbon feed 320 can be obtained from any hydrocarbon source derived from crude oil. Non-limiting examples of hydrocarbon feed 320 include whole range crude oil, topped crude oil, reduced crude oil, atmospheric residue, vacuum residue, and heavy fractions produced from thermal cracking processes including coking and visbreaking. "Whole range crude oil" refers to passivated crude oil which has been processed by a gas-oil separation plant after being recovered from a production well. "Topped crude oil" can also be known as "reduced crude oil" and refers to a crude oil having no light fraction, and would include an atmospheric residue stream or a vacuum residue stream. Hydrocarbon feed 320 can be obtained from any hydrocarbon source from a petrochemical process. Non-limiting examples of hydrocarbon feed 320 include pyrolysis fuel oil from a steam cracking process.

Hydrocarbon feed 320 can have an asphaltene content greater than about 0.1 wt. % or alternately greater than about 0.8 wt. %. For example, the asphaltene content of an atmospheric residue obtained from Arab Extra Light crude oil can be about 0.8 wt. %. Hydrocarbon feed 320 can have a toluene-insoluble content less than about 1 wt. % or alternately less than about 0.5 wt. %. Depending on the viscosity, hydrocarbon feed 320 can be preheated using a heater or heat exchanger such as an electric heater, a fired heater, and a cross exchanger. Hydrocarbon feed 320 can be preheated to a temperature ranging between about 100 deg. C. and about 500 deg. C., alternately between about 150 deg. C. and about 400 deg. C., or alternately between about 150 deg. C. and about 350 deg. C. In at least one embodiment, the temperature of hydrocarbon feed 320 is about 250 deg. C.

Hydrocarbon feed 320 is passed to pump 302 to produce hydrocarbon stream 321. Pump 302 can be any type of pump capable of increasing the pressure of hydrocarbon feed 320. Non-limiting examples of pump 302 can include a diaphragm metering pump and a plunger type pump. The pressure of hydrocarbon stream 321 can range between about 0.1 MPa and about 5 MPa, alternately between about 1 MPa and about 5 MPa, or alternately between about 2 MPa and about 4 MPa. In at least one embodiment, the pressure of hydrocarbon stream 321 is about 3.4 MPa.

Optionally, hydrocarbon feed 320 can be passed to a filter (not shown). The filter can be any type of filter capable of removing solid materials present in hydrocarbon feed 320. The filter can reject solid particles greater than 10 millimeters (mm), alternately greater than 5 mm, or alternately greater than 1 mm. In at least one embodiment, hydrocarbon feed 320 can pass a filter such that solid materials having a size greater than 5 mm are removed.

First solvent feed 322 is introduced to the process 300. First solvent feed 322 can include any solvent capable of mixing with non-asphaltene components of hydrocarbon feed 320 such that asphaltene forms an aggregate or a precipitate that can be recovered via pitch stream 328. Non-limiting examples of the solvent used in first solvent feed 322 can include normal C3-C10 alkanes such as propane, n-butane, n-pentane, n-hexane, n-heptane, n-octane, n-nonane, and n-decane. In at least one embodiment, first solvent feed 322 includes propane, n-butane, n-pentane, and combinations of the same.

First solvent feed 322 is passed to pump 304 to produce first solvent stream 323. Pump 304 can be any type of pump capable of increasing the pressure of first solvent feed 322. Non-limiting examples of pump 304 can include a diaphragm metering pump and a plunger type pump. The pressure of first solvent stream 323 can range between about 0.1 MPa and about 5 MPa, alternately between about 1 MPa and about 5 MPa, or alternately between about 2 MPa and about 4 MPa. In at least one embodiment, the pressure of first solvent stream 323 is about 3.4 MPa.

Hydrocarbon stream 321 and first solvent stream 323 are passed to mixer 306 to produce mixed stream 325. Mixer 306 can be any type of mixing device capable of preliminarily mixing the hydrocarbon stream 321 and first solvent stream 323. Non-limiting examples of mixing devices suitable for use as mixer 306 can include a static mixer, an inline mixer, and impeller-embedded mixer. Mixed stream 325 can have an S/O volume ratio ranging between about 0.1 and about 10 or alternately between about 0.2 and about 2. In at least one embodiment, mixed stream 325 has an S/O volume ratio of about 1.3.

Mixed stream 325 is introduced to TC mixer 310. TC mixer 310 can have a configuration similar to TC mixer 200 as shown in FIG. 2. The inner cylinder radius to outer cylinder radius ratio ($\eta$) can range between about 0.75 and about 0.95 or alternately between about 0.79 and about 0.92. In at least one embodiment, inner cylinder radius to outer cylinder radius ratio ($\eta$) is about 0.83. The gap aspect ratio ($d/r_1$) can range between about 0.05 and about 0.4 or alternately between about 0.075 and about 0.277. In at least one embodiment, the gap aspect ratio ($d/r_1$) is about 0.206. The rotation speed of the inner cylinder 220 is controlled to provide a reduced Taylor number $Ta_r$ greater than about 100 or alternately greater than about 1,000. The length aspect ratio ($L_r/d$) is greater than about 40 or alternately greater than about 55. In at least one embodiment, the length aspect ratio ($L_r/d$) is about 56. The inner volume of TC mixer 310 (defined by gap and length) can range between about 0.1% of the input volume flow rate and about 1% of the input volume flow rate. TC mixer 310 is operated to produce mixed stream 324.

Second solvent feed 326 is introduced to the process 300. Second solvent feed 326 can include any solvent capable of mixing with non-asphaltene components of mixed feed 324 such that asphaltene forms an aggregate or a precipitate that can be recovered via pitch stream 328. Non-limiting examples of the solvent used in second solvent feed 326 can include normal C3-C10 alkanes such as propane, n-butane, n-pentane, n-hexane, n-heptane, n-octane, n-nonane, and n-decane. In at least one embodiment, second solvent feed 326 includes propane, n-butane, n-pentane, and combinations of the same.

Second solvent feed 326 is passed to pump 308 to produce second solvent stream 327. Pump 308 can be any type of pump capable of increasing the pressure of second solvent feed 326. Non-limiting examples of pump 308 can include a diaphragm metering pump and a plunger type pump. The pressure of second solvent stream 327 can range between about 0.1 MPa and about 5 MPa, alternately between about 1 MPa and about 5 MPa, or alternately between about 2 MPa and about 4 MPa. In at least one embodiment, the pressure of second solvent stream 327 is about 3.4 MPa. The flow rate of second solvent stream 327 is controlled by pump 308 such that the total S/O volume ratio (that is, the volume ratio between the sum of first solvent and second solvent, and the hydrocarbon) in extractor 312 ranges between about 0.25 and about 10 or alternately between about 0.5 and about 5. In at least one embodiment, the total S/O volume ratio in extractor 312 is about 2.7.

Mixed stream 324 and second solvent stream 327 are introduced to extractor 312. Second solvent stream 327 is introduced to extractor 312 at a vertical position lower than that of mixed stream 324. The vertically lower position of second solvent stream 327 than that of mixed stream 324 is to maximize contact between components of both mixed stream 324 and second solvent stream 327 and to capitalize on gravitational forces affecting the resulting mixture of such components within extractor 312. Extractor 312 can include a temperature controlling device (not shown) capable of heating or cooling the internal temperature of extractor 312 during operation. The temperature controlling device can include a strip heater, immersion heater, tubular furnace, heat exchanger, or like devices known in the art. The temperature controlling device can be located in the interior or the exterior of extractor 312, or on the fluid line where mixed stream 324 passes. Extractor 312 can be operated such that the internal fluids are maintained at a temperature ranging between about 30 deg. C. and about 250 deg. C. or alternately between about 50 deg. C. and about 150 deg. C. In at least one embodiment, extractor 312 is operated such that the internal fluids are maintained at a temperature of about 120 deg. C. Extractor 312 can be operated such that the internal fluids are maintained at a pressure ranging between 0.1 MPa and about 5 MPa, alternately between about 1 MPa and about 5 MPa, or alternately between about 2 MPa and about 4 MPa. In at least one embodiment, extractor 312 is operated such that the internal fluids are maintained at a pressure of about 3.4 MPa. Temperature of the internal fluids are maintained at a temperature less than the boiling point of the solvent at the operating pressure. Extractor 312 has a dimension large enough to provide ample time for asphaltene extraction. Extractor 312 can be a tubular type reactor, a vessel type reactor, or like devices known in the art. The residence time of the internal fluids in extractor 312 can range between about 1 minute (min) and about 120 minutes. Extractor 312 produces pitch stream 328 collected at the bottom and DAO stream 330 collected at the top. Pitch stream 328 includes asphaltenes. In at least one embodiment, pitch stream 328 is in the absence of DAO. DAO stream 330 includes DAO, the first solvent, and the second solvent. In at least one embodiment, DAO stream 330 is in the absence of asphaltenes.

DAO stream 330 is passed to pressure reducer 314 to produce DAO stream 332. Pressure reducer 314 can be any type of device capable of reducing the pressure of a fluid stream. Non-limiting examples of pressure reducer 314 can include a pressure let-down valve, a pressure control valve, and a back pressure regulator. The pressure of DAO stream 332 can range between about 0 MPa and about 1 MPa, alternately between about 0.01 MPa and about 0.5 MPa, or alternately between about 0.05 MPa and about 0.1 MPa. In at least one embodiment, the pressure of DAO stream 332 is about 0.07 MPa.

DAO stream 332 is introduced to solvent recovery unit 316. Solvent recovery unit 316 separates DAO stream 332 into DAO stream 334 and recovered solvent stream 336. DAO stream 334 includes DAO which are in the liquid phase. Recovered solvent stream 336 includes the first solvent and the second solvent which are in the gas phase. Solvent recovery unit 316 is operated such that the internal fluids are maintained at a temperature ranging between about 0 deg. C. and about 150 deg. C., alternately between about 30 deg. C. and about 120 deg. C., or alternately between about 50 deg. C. and about 100 deg. C. In at least one embodiment, solvent recovery unit 316 is operated such that the internal fluids are maintained at a temperature of about 90 deg. C. Solvent recovery unit 316 is operated such that the internal fluids are maintained at a pressure ranging between about 0 MPa and about 1 MPa, alternately between about 0.01 MPa and about 0.5 MPa, or alternately between about 0.05 MPa and about 0.1 MPa. In at least one embodiment, solvent recovery unit 316 is operated such that the internal fluids are maintained at a pressure of about 0.07 MPa. In this manner, the first solvent and the second solvent including normal C3-C5 alkanes exist in the gas phase while the DAO exists in the liquid phase.

EXAMPLES

The disclosure is illustrated by the following examples, which are presented for illustrative purposes only, and are not intended as limiting the scope of the invention which is defined by the appended claims.

A process having a configuration similar to FIG. 3 was modeled using the HYSYS Hydroprocessing Model (Aspen Technology, Inc., Bedford Mass.). Certain parameters of the TC mixer were obtained by experiment. In reference to the properties of the stream for Example, the description and stream numbers for FIG. 3 is used.

A hydrocarbon feed (stream 320) was introduced to the respective process. The hydrocarbon feed was a vacuum residue obtained from Arabian Medium crude oil having a composition and properties as shown in Table 1. The temperature of the hydrocarbon feed was maintained at about 160 deg. C. The pressure of the hydrocarbon feed was maintained at about 3.4 MPa (stream 321). The volume flow rate of the hydrocarbon feed was maintained at about 4.86 liters per hour (L/hr).

TABLE 1

| | |
|---|---:|
| Mass Flow Rate (kg/hr) | 5.0 |
| API Gravity | 5.9 |
| Kinematic Viscosity at 93.3 deg. C. (cSt) | 2,181 |
| Kinematic Viscosity at 148.9 deg. C. (cSt) | 132 |
| Distillation Properties (deg. C.) | |
| TBP 5% | 523.3 |
| TBP 10% | 537.2 |
| TBP 20% | 566.1 |
| TBP 30% | 597.8 |
| TBP 50% | 673.3 |
| TBP 70% | 774.4 |
| Sulfur Content (wt. %) | 5.1 |
| Vanadium (wt. ppm) | 110 |
| Asphaltenes (wt. %) | 8.5 |
| Microcarbon Residue (wt. %) | 19.9 |

A first solvent feed (stream 322) was introduced to the respective process. The first solvent included n-pentane having a purity of 97 wt. %. Impurities included n-butane, iso-pentane, and n-hexane. The temperature of the first solvent feed was maintained at room temperature. The pressure of the first solvent feed was maintained at about 3.4 MPa (stream 323). The volume flow rate of the first solvent feed was maintained at about 6.352 L/hr.

The hydrocarbon feed and the first solvent feed were combined. The S/O volume ratio was about 1.3. The combined stream (stream 325) was introduced to the inlet of the TC mixer (unit 310). The TC mixer produced a mixed stream via outlet of the TC mixer (stream 324). Dimensions of the TC mixer are shown in Table 2. Operating conditions of the TC mixer are shown in Table 3.

TABLE 2

| Property | Notation (Unit) | Value |
| --- | --- | --- |
| Inner Cylinder Radius | $r_1$ (m) | 0.0226 |
| Outer Cylinder Radius | $r_2$ (m) | 0.0273 |
| Gap Width | d (m) | 0.0047 |
| Area of Cross-Sectional Surface | A (m$^2$) | 0.00073 |
| Length | $L_r$ (m) | 0.26 |
| Gap Aspect Ratio | $d/r_1$ | 0.206 |
| Radius Ratio | $\eta = r_1/r_2$ | 0.83 |
| Length Aspect Ratio | $L_r/d$ | 56 |
| Inner Volume | $V_r$ (mL) | 189 |
| Critical Azimuthal Reynolds Number | $Re_{\theta c}$ | 103 |
| Critical Taylor Number (batch operation without axial flow) | $Ta_c$ | 1970 |

TABLE 3

| Property | Value |
| --- | --- |
| Mass Flow Rate (kg/hr) | 9 |
| Volume Flow Rate (L/hr) | 11.26 |
| Mean Flow Velocity (m/s) | 0.0043 |
| Residence time (s) | 60 |
| Kinematic Viscosity at 120 deg. C. (cSt) | 2 |
| Solvent/Oil by weight | 0.8 |
| Temperature (deg. C.) | 120 |
| Axial Flow Reynolds Number ($Re_z$) | 12 |
| Critical Azimuthal Reynolds Number ($Re_{\theta c}$) | 107 |
| Critical Taylor Number ($Ta_c$) | 2100 |
| Minimum Mixing Rate (RPM) | 225 |
| Maximum Mixing Rate (RPM) | 750 |
| Selected Mixing Rate (RPM) | 450 |
| Minimum Dissipation Energy (W/kg) | 0.14 |
| Maximum Dissipation Energy (W/kg) | 2.755 |
| Selected Dissipation Energy (W/kg) | 0.78 |
| Minimum Shear Rate (s$^{-1}$) | 291 |
| Maximum Shear Rate (s$^{-1}$) | 1288 |
| Selected Shear Rate (s$^{-1}$) | 686 |
| Minimum Taylor number (Ta) | 415094 |
| Maximum Taylor number (Ta) | 4612158 |
| Selected Taylor number (Ta) | 1660377 |
| Minimum Azimuthal Reynolds Number ($Re_\theta$) | 1492 |
| Maximum Azimuthal Reynolds Number ($Re_\theta$) | 4972 |
| Selected Azimuthal Reynolds Number ($Re_\theta$) | 2983 |
| Minimum Angular Velocity (s$^{-1}$) | 23.56 |
| Maximum Angular Velocity (s$^{-1}$) | 78.54 |
| Selected Angular Velocity (s$^{-1}$) | 47.12 |

A second solvent feed (stream 326) was introduced to the respective process. The second solvent included n-pentane having a purity of 97 wt. %. Impurities included n-butane, iso-pentane, and n-hexane. The temperature of the second solvent feed was maintained at room temperature. The pressure of the second solvent feed was maintained at about 3.4 MPa (stream 327). The volume flow rate of the first solvent feed was maintained at about 6.670 L/hr.

The mixed stream produced by the TC mixer and the second solvent feed were separately introduced to an extractor vessel (unit 312). The total S/O volume ratio was about 2.7. The extractor vessel had an internal volume of about 9.8 liters. The extractor vessel had a heating jacket on the exterior such that temperature of the internal fluid was maintained at about 120 deg. C. The pressure of the extractor vessel was maintained at about 3.4 MPa by using a pressure control valve located at the top outlet. The extractor vessel separated the mixed stream into a DAO stream (stream 330) and a pitch stream (stream 328). The pitch stream was discharged from the extractor vessel intermittently using a discharge valve at the bottom outlet. The pitch stream has a mass flow rate of about 1.6 kg/hr.

The DAO stream was depressurized to a pressure of about 0.07 MPa (stream 332). The DAO stream was introduced to a solvent recovery unit (unit 316). The internal fluid of the solvent recovery unit was maintained at a temperature of about 90 deg. C. The internal fluid of the solvent recovery unit was maintained at a pressure of about 0.07 MPa. The solvent recovery unit produced a DAO stream (stream 334) and a recovered solvent stream (stream 336). The solvent stream included gas phase n-pentane. The DAO stream was in the absence of n-pentane. The composition and properties of the DAO stream are shown in Table 4.

TABLE 4

| Mass Flow Rate (kg/hr) | 3.4 |
| --- | --- |
| API Gravity | 21.2 |
| Kinematic Viscosity at 93.3 deg. C. (cSt) | 146 |
| Kinematic Viscosity at 148.9 deg. C. (cSt) | — |
| Distillation Properties (deg. C.) | |
| TBP 5% | 491.7 |
| TBP 10% | 509.4 |
| TBP 20% | 531.7 |
| TBP 30% | 547.8 |
| TBP 50% | 571.7 |
| TBP 70% | 597.8 |
| Sulfur Content (wt. %) | 1.8 |
| Vanadium (wt. ppm) | 8 |
| Asphaltenes (wt. %) | <0.1 |
| Microcarbon Residue (wt. %) | <0.1 |

As shown in Table 4, the DAO yield was about 68 wt. %. About 65% of sulfur was removed. About 91% of vanadium was removed. In a comparative example, a process having a configuration similar to FIG. 3 but in the absence of the TC mixer resulted in about 23% sulfur removal and about 68% vanadium removal at a 68 wt. % DAO yield condition.

The results show that an SDA process involving a TC mixer is effective to remove asphaltenes using an S/O volume ratio substantially less than the conventional ratio (that is, an S/O volume ratio ranging between 4 and 13).

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for deasphalting a hydrocarbon feed, the method comprising the steps of:
    pressurizing the hydrocarbon feed to a pressure ranging between 2 MPa and 4 MPa;
    heating the hydrocarbon feed to a temperature ranging between 150 deg. C and about 350 deg. C;
    pressurizing a first solvent to a pressure ranging between 2 MPa and 4 MPa;
    combining the hydrocarbon feed and the first solvent using a Taylor-Couette (TC) mixer to form a mixed stream, wherein the hydrocarbon feed comprises asphaltenes, wherein the mixed stream has a solvent-to-oil volume ratio ranging between 0.2 and 2, wherein the mixed stream has a reduced Taylor number of greater than about 1,000, wherein the TC mixer comprises:
        an inner cylinder; and
        an outer cylinder,
            wherein the inner cylinder and the outer cylinder are concentric,
            wherein the outer cylinder is stationary and includes an inlet and an outlet, the inlet configured to receive the hydrocarbon feed and the first solvent, the outlet configured to exit the mixed stream,
            wherein the inner cylinder is rotating at a predetermined angular velocity,
            wherein the ratio of inner cylinder radius ($r_1$) to outer cylinder radius ($r_2$) is between about 0.75 to about 0.95,
            wherein the length aspect ratio ($L_y/d$) is greater than about 40, wherein the gap aspect ratio ($d/r_1$) is between about 0.075 and about 0.277;
    introducing the mixed stream and a second solvent to an extractor to produce a first deasphalted oil stream and a pitch stream, wherein the first deasphalted oil stream is substantially in the absence of the asphaltenes, wherein the pitch stream comprises the asphaltenes; and
    introducing the first deasphalted oil stream to a solvent recovery unit to recover the first solvent and the second solvent via a recovered solvent stream and to produce a second deasphalted oil stream, wherein the second deasphalted oil stream is substantially in the absence of the first solvent and the second solvent.

2. The method of claim 1, wherein the hydrocarbon feed is selected from the group consisting of: an atmospheric residue fraction, a vacuum residue fraction, and combinations thereof.

3. The method of claim 1, wherein the first solvent is selected from the group consisting of: propane, n-butane, n-pentane, and combinations of the same.

4. The method of claim 1, further comprising the step of:
    pressurizing the second solvent to a pressure ranging between 2 MPa and 4 MPa.

5. The method of claim 1, wherein the second solvent is selected from the group consisting of: propane, n-butane, n-pentane, and combinations of the same.

6. The method of claim 1, wherein the extractor is operated at a temperature ranging between 50 deg. C and 150 deg. C and a pressure ranging between 2 MPa and 4 MPa.

7. The method of claim 1, wherein the second solvent is introduced to the extractor at a position vertically lower than that of the mixed stream.

8. The method of claim 1, wherein the extractor is operated to have a total solvent-to-oil volume ratio ranging between 0.5 and 5.

9. The method of claim 1, further comprising the step of:
    depressurizing the first deasphalted oil stream to a pressure ranging between 0.05 MPa and 0.1 MPa.

10. The method of claim 1, wherein the solvent recovery unit is operated at a temperature ranging between 50 deg. C and 100 deg. C and a pressure ranging between 0.05 MPa and 0.1 MPa such that the recovered solvent stream includes the first solvent and the second solvent existing in gas phase.

* * * * *